United States Patent [19]
Jewett et al.

[11] 4,088,372
[45] May 9, 1978

[54] UNITARY WHEEL FOR INDUSTRIAL USE

[75] Inventors: James Wilson Jewett; Terry Wayne Beemer, both of Dubuque, Iowa

[73] Assignee: Deere & Company, Moline, Ill.

[21] Appl. No.: 688,675

[22] Filed: May 21, 1976

[51] Int. Cl.² .............................................. B60B 1/06
[52] U.S. Cl. .................................. 301/63 R; 301/97; 228/178; 403/271
[58] Field of Search ............... 301/5 R, 63 DD, 63 R, 301/95–99; 295/16; 228/178, 182; 29/159.01, 159.03, 159.1; 219/137, 159, 102; 113/116 R, 116 E, 116 D, 116 W; 403/270, 271

[56] References Cited

U.S. PATENT DOCUMENTS

| | | | |
|---|---|---|---|
| 1,853,549 | 4/1932 | Clark | 285/286 |
| 2,551,783 | 5/1951 | Ash | 301/97 |
| 3,185,815 | 5/1965 | Anderson | 219/137 R |
| 3,210,126 | 10/1965 | Travers | 301/63 R |
| 3,858,025 | 12/1974 | Sidbeck et al. | 219/137 R |

FOREIGN PATENT DOCUMENTS

| | | | |
|---|---|---|---|
| 26,792 | 10/1920 | Denmark | 301/5 R |
| 1,392,609 | 2/1965 | France | 301/97 |
| 1,150,537 | 4/1969 | United Kingdom | 301/63 DD |

*Primary Examiner*—Robert B. Reeves
*Assistant Examiner*—H. Grant Skaggs

[57] ABSTRACT

A wheel for industrial use is constructed of five parts welded together to form a unitary piece. Specifically, the wheel includes a rim defined by a central cylindrical part having flanges welded to its opposite ends and cooperating therewith to define a single deep well. A pair of disks cooperate together to form a drive disk structure of the wheel. These disks are located within the central cylindrical part of the wheel and have convoluted peripheries welded to the cylindrical part. The periphery of one of the disks is located such that it crisscrosses the weld seam between one of the flanges and one end of the cylindrical part and is also welded to the last mentioned flange.

1 Claim, 2 Drawing Figures

UNITARY WHEEL FOR INDUSTRIAL USE

BACKGROUND OF THE INVENTION

The present invention relates to a wheel and more particularly relates to a one-piece wheel.

Industrial vehicles often require heavy ply tires and, in an attempt to simplify the mounting of these tires, designers have provided wheels including multi-piece rims that may either be split apart at their center or at their flanges. These rims present a safety hazard associated with the assembly and disassembly of loose pieces when mounting and dismounting a tire.

SUMMARY OF THE INVENTION

According to the present invention there is provided a novel one-piece wheel.

An object of the invention is to provide a one-piece wheel which is of rugged, simple construction.

Another object of the invention is to provide a one-piece wheel of welded construction wherein certain welded parts strengthen the weld joint between other welded parts.

A more specific object of the invention is to provide a wheel including a rim having a drive disk member located there inside and welded thereto, the disk member being provided with a fluted or convoluted periphery whereby the seam of weld material securing the disk member to the rim is longer than and the rim-to-disk weld stress riser is no longer in a single plane resulting in localized stresses at the weld joint being less than would be the case if the entire periphery was located in a single plane.

These and other objects will become apparent from reading the ensuing description together with the appended drawings.

DESCRIPTION OF THE PREFERRED EMBODIMENT

Figure 1:
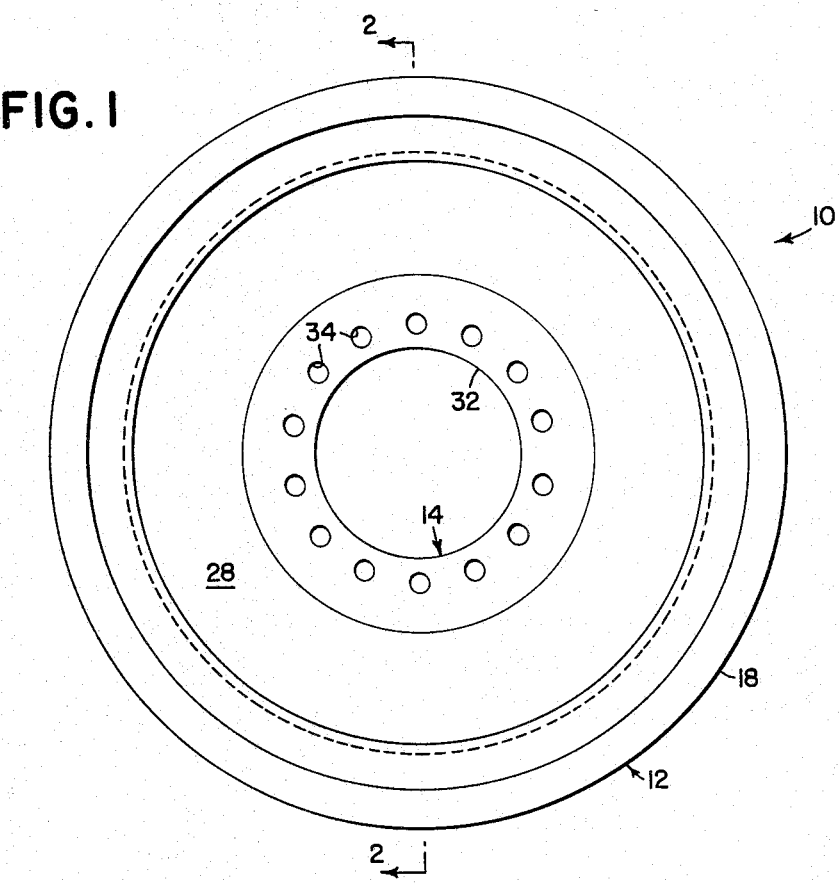
FIG. 1 is a side elevational view of a wheel constructed according to the principles of the present invention.
Figure 2:
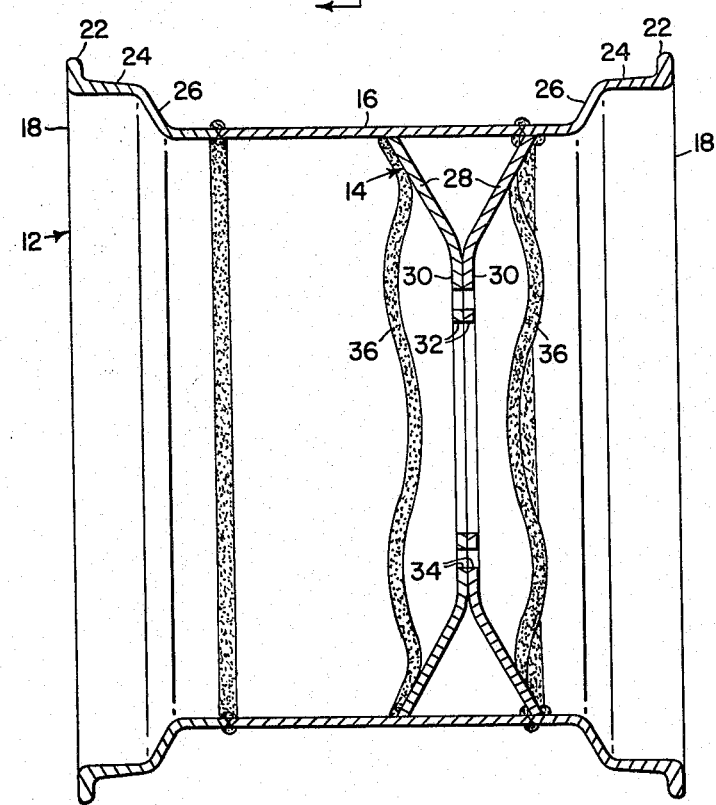
FIG. 2 is a sectional view taken along the line 2—2 of FIG. 1.

Referring now to the drawing, therein is shown a wheel 10 comprising a rim 12 and a drive disk structure 14. The rim 12 includes a central cylindrical part 16 having identical flanges 18 joined to its opposite ends by circular weld seams 20. The flanges 18 each include a radially extending bead retaining portion 22, a slightly inclined bead seating portion 24 and a stepped inner portion 26 which cooperates with the central cylindrical part 16 of the wheel so as to form a relatively deep well necessary for mounting and dismounting a tire on the rim 12.

The disk structure 14 includes a pair of dished disk members 28 having central portions 30 engaged with each other and provided with axially aligned circular openings 32 for receiving a circular axle flange shoulder and a plurality of aligned, circularly arranged holes 34 for receiving wheel mounting studs. The outer peripheral portions of the disk members 28 are welded to an inside wall of the rim 12 and are fluted or convoluted such that respective peripheral edges of the members 28 meet or engage the interior of the rim 12 at a non-circular somewhat zig-zag line along which each member 28 is secured to the rim 12 by a weld seam 36. The disk members 28 are located in the rim 12 such that the peripheral edge of one is located approximately halfway between the opposite ends of the rim part 16 while the peripheral edge of the other is located so as to crisscross the weld seam 20 between one of the flanges 18 and one end of the rim part 16.

The operation of the wheel is thought to be apparent from the foregoing description. Suffice it to say that by making the peripheries of the members 28 fluted and by positioning the one periphery so as to crisscross the weld seam 20 a strong welded one-piece wheel structure results since relatively long weld connections between the members 28 and the rim 12 are formed, planar rim-to-disk weld stress risers are avoided resulting in diminished stress concentration at the weld joints and the seam 20 is "reinforced".

We claim:

1. A unitary wheel construction comprising: a rim including a cylindrical central part having opposite ends to which first and second annular flanges are respectively joined by means of first and seond circular seams of weld material; a drive disk structure located inside said rim and including first and second disks; said first disk having an outer peripheral edge continuously engaged with the rim through 360° of contact and being convoluted and crisscrossing said first circular seam of weld material; said peripheral edge being joined to said central part and first annular flange by a continuous third seam of weld material; and said second disk having peripheral edge spaced from the peripheral edge of said first disk and engaged continuously with the rim through 360° of contact and joined to the central part by means of a continuous fourth seam of weld material located approximately halfway between the opposite ends of the central part.

* * * * *